United States Patent [19]
Peters

[11] 3,785,728
[45] Jan. 15, 1974

[54] MICROFILM VIEWER

[75] Inventor: Arnis E. Peters, La Crosse, Wis.

[73] Assignee: Gelatt Investments, Inc., La Crosse, Wis.

[22] Filed: Aug. 26, 1971

[21] Appl. No.: 175,123

Related U.S. Application Data

[63] Continuation-in-part of Ser. No. 90,514, Nov. 18, 1970, Pat. No. 3,700,321.

[52] U.S. Cl. .................................. 353/26, 353/78
[51] Int. Cl. .................. G03b 21/11, G03b 21/28
[58] Field of Search ............... 353/27, 26, 25, 75, 353/101, 122, 78; 352/72, 78, 180; 242/67.4; 350/283

[56] References Cited
UNITED STATES PATENTS

| | | | |
|---|---|---|---|
| 2,692,529 | 10/1954 | Halahan | 353/76 |
| 3,498,707 | 3/1970 | Allen | 353/26 |
| 3,523,657 | 8/1970 | Hearon | 242/67.4 |
| 1,957,120 | 5/1934 | Weiss | 242/67.4 |
| 858,847 | 5/1907 | Allen | 242/67.4 |
| 2,637,246 | 5/1953 | Wolk | 350/283 |
| 2,639,641 | 5/1953 | Piwczynski | 350/283 |
| 2,464,220 | 3/1949 | Duncan | 353/26 |
| 2,518,671 | 8/1950 | Eagle | 353/101 |

FOREIGN PATENTS OR APPLICATIONS

| | | | |
|---|---|---|---|
| 350,090 | 7/1937 | Italy | 242/67.4 |
| 1,103,627 | 3/1961 | Germany | 353/101 |

Primary Examiner—Louis R. Prince
Assistant Examiner—A. J. Mirabito
Attorney—Lettvin et al.

[57] ABSTRACT

A portable, compact viewer for illuminating, enlarging and viewing individual microfilm frames which are carried on a filmstrip prepackaged in a cassette. The viewer is provided with electrical drive means for transporting the filmstrip within the cassette in a forward or reverse direction, at a high speed for traversing or at a low speed for scanning. Means integral with the drive means are provided to inhibit overrun of the transport, so as to provide accurate location and alignment of single frames and to provide substantial inching control. The viewer includes a cassette receiving compartment whose cover may be spring biased toward operative positions, and which cover aids in aligning the cassette with the optical system, and may additionally cooperate to prevent excessive heating from a heat source such as an illumination bulb. The viewer housing is of an improved construction which assures a high-contrast image under normal light conditions.

3 Claims, 11 Drawing Figures

PATENTED JAN 15 1974

MICROFILM VIEWER

CROSS REFERENCE TO RELATED APPLICATIONS

This application is a continuation-in-part of U. S. Patent application Ser. No. 90,514, filed Nov. 18, 1970 now U.S. Pat. No. 3,700,321 in the name of the inventor hereof and assigned to the assignee herein.

BACKGROUND OF THE INVENTION

This invention relates to microfilm viewers; and in particular to improved means for transporting the microfilm strip within a cassette used in the microphotograph viewer.

The use of microphotographs, printed on cards or on film-like cards known as fiche, and viewers for illuminating, enlarging and projecting selected frames of such cards or fiches onto a viewing screen, are well-known in the art.

The viewer disclosed in U. S. Pat. application Ser. No. 90,514 is an apparatus for viewing single frames on a microfilm strip which is contained within a cassette that can be readily loaded into a cassette receiving compartment in the viewer. The viewer disclosed therein uses a manual or electrically adapted means for transporting the filmstrip within the cassette.

It has been shown to be desirable to provide an improved means for transporting the microfilm strip at both high and low speeds; furthermore, improved means for aligning the cassette with the optical system is desirable when the film is transported at high speeds. Improved cooling for the illuminating bulb and drive means are also desirable.

SUMMARY OF THE INVENTION

By virtue of this invention there is provided a microfilm viewer which includes an improved electrically driven, reversible, variable speed, transport system for moving the filmstrip within the cassette. The transport system also includes a substantially instantaneous stop whereby the inertia of the moving transport system is overcome to permit accurate selection and positioning of the projected frames. Additionally, means are provided in association with the cassette compartment which aids in accurately aligning the cassette in the optical projection system and also provides for improved convection cooling of the projection bulb.

These and other improvements and features of this viewer will be described hereinafter.

BREIF DESCRIPTION OF THE DRAWINGS

FIGS. 7a and 7b are enlarged fragmentary bottom plan views on the film transport system taken substantially along line 7—7 shown in FIG. 3, with FIG. 7a depicts the transport system when the left-hand gears are driven while FIG. 7b depicts the transport systen when the right-hand gears are driven for reverse rotation;

DESCRIPTION OF THE PREFERRED EMBODIMENT

VIEWER STRUCTURE

Figure 1:
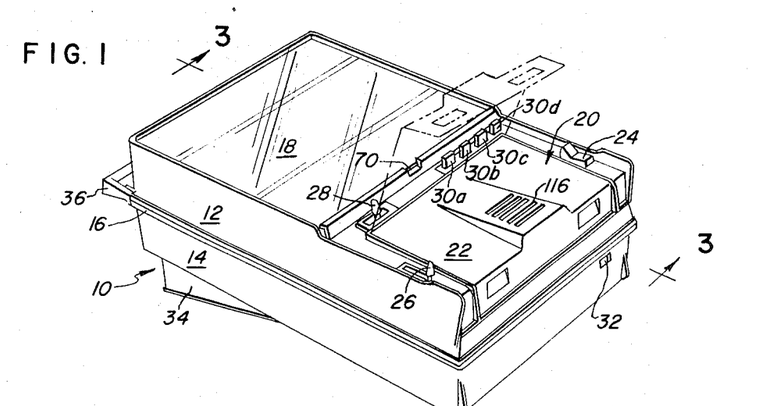
FIG. 1 is a perspective view of a microfilm viewer in position for use and showing, by broken lines, the cassette compartment cover in a raised or open position.

Referring first to FIG. 1 the viewer 10, generally, is shown in position and ready for use. The viewer includes an upper dish-shaped casing member 12, a lower dish-shaped casing member 14 and a central supporting frame 16 to which the upper and lower casing members are secured. The upper casing member 12 carries a viewing screen 18 which is positioned in the upper surface at the distal or far end of the viewer; a cassette receiving compartment 20 generally, is provided at the proximal or near end of the viewer. A cassette compartment cover 22 is pivotly mounted to the upper casing for opening and closing the cassette receiving compartment from the proximal end of the viewer. Also provided at the proximal end, adjacent the compartment 20, are a series of controls for operating the viewer. A rocker-type on/off switch 24 is provided on the right-hand side of the cassette receiving compartment while a cassette eject lever 26 is provided on the left-hand side. A focus control lever 28 is provided at a position intermediate the viewing screen 18 and the cassette compartment 20; and to the right of the focus control lever there are provided four push button switches for controlling the direction and speed of the film transport system. The left-most push button 30a is a low speed or scanning control button for transporting the film in a direction so that when viewing the screen 18 from the proximal end of the viewer the image moves to the left; the push button 30b is a high speed traverse in the same direction as with 30a; the button 30c is a high speed traverse in the opposite direction; and the button 30d is a slow speed traverse in the same direction as 30c. A switch 32 is provided in the lower casing member 14 for controlling a high and low filament bulb described hereinafter.

In order to project the image on the screen 18, a stand and mirror support 34 is provided which can be opened and secured in a position extending from the bottom of the lower casing member 14. As will be described hereinafter the stand and support member 34 can be moved into a retracted position wherein its bottom surface is substantially flush with the bottom surface of the lower casing member 14. A pivotally mounted handle 36 for carrying the viewer is mounted to the frame 16 at the distal end of the viewer.

Figure 2:
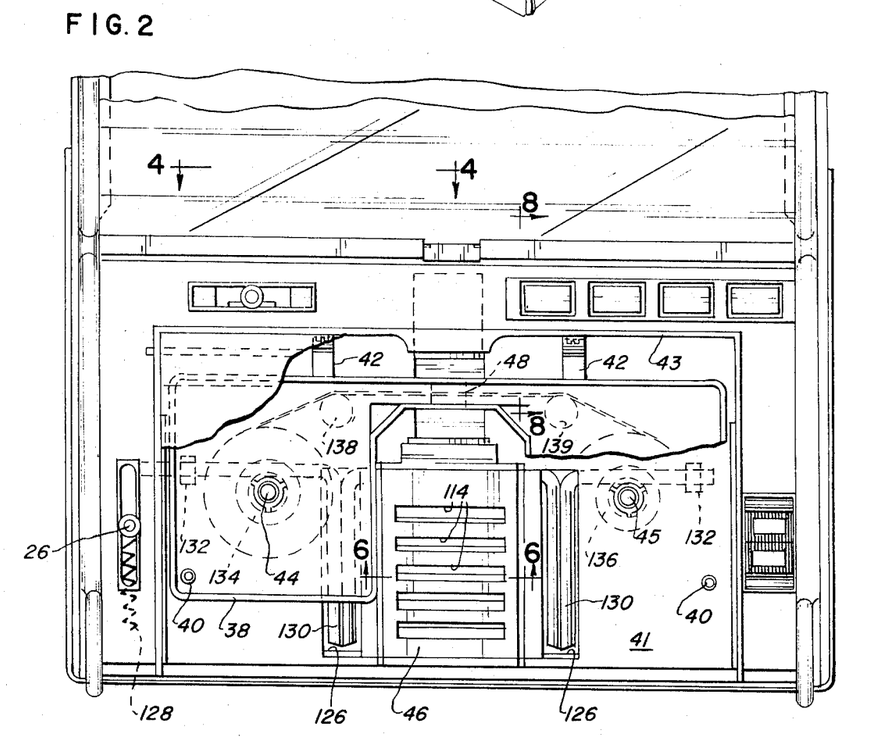
FIG. 2 is an enlarged fragmentary top plan view with portions of the compartment cover broken away and showing various viewer controls and a cassette in place in the cassette compartment and in association with a portion of the optical system.

Referring now to FIG. 2 a microfilm containing cassette 38 is shown in position in the cassette compartment 20. The cassette 38 is maintained in proper optical alignment by means of the upwardly projecting guide pins 40 which are mounted to the compartment floor 41; the pins 40 engage mating positioning slots in the cassette. Lateral alignment of the cassette is further assured by the cassette biasing leaf springs 42 which are mounted to the distal or far wall 43 of the cassette compartment. Further alignment is assured by means of the fixedly positioned drive hubs 44 and 45, and the bulb housing 46. All this alignment assures that the cassette aperture 48 is optically aligned with the illumination means in the housing 46 and the mirror and viewing system screen as described hereinafter.

Figure 3:
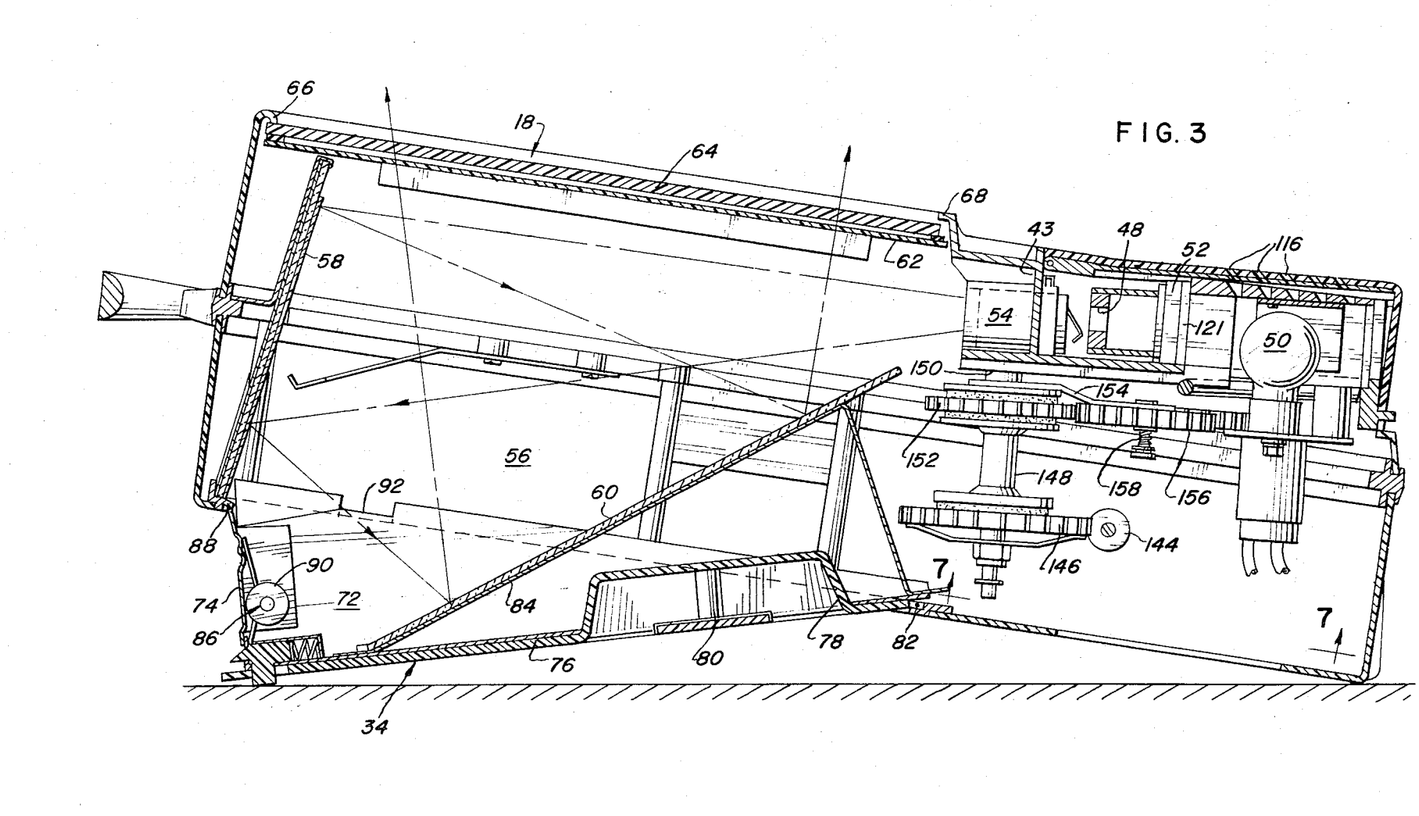
FIG. 3 is an enlarged vertical and longitudinal cross-section view, taken substantially on line 3—3 shown in FIG. 1.

Referring now to FIG. 3 it is seen that the illumination means include a projection lamp or bulb 50 which projects light through the columnating lens system 52, the cassette aperture 48 and the objective lens system 54. From the objective lens system 54 the image is projected into a reflecting chamber 56 and against a small reflecting and enlarging mirror 58 which is mounted to the frame 16 at the distal end of the compartment; the projected image is then reflected onto a larger second reflecting mirror 60 which is mounted to the mirror support and stand 34. When the support 34 is in its lower or extended position, as shown in FIG. 1, the mirror 60 is positioned so as to reflect the image directed toward it upwardly and onto the back side of the viewing screen 18.

The chamber 56 is made light-tight, as described hereinafter, so that a high-contrast image appears on the screen 18. The screen 18 comprises two elements, the first being a ground-glass-type transparent plate 62 which is fixedly secured to the upper casing 12. The second element is a removable dark screen 64 which can be removably secured to the upper casing, by means of the rolled edge 66 at the distal end of the viewing screen and a flange 68 which is adapted to engage the proximal end of the dark screen. However, it will be noted from FIG. 1 that that flange is provided with a central cutout portion 70 which permits the user to push the dark screen 64 toward the distal end of the casing and then pivot it upwardly so as to remove it from its position overlying the ground-glass-type screen 62. The use of interchangeable dark screens permits this microfilm viewer to be used under ambient light conditions.

Referring now to the structural features of the chamber, or compartment, 56 it is seen that the top surface of that compartment is formed by the viewing screen 18 while the distal end, and left and right-hand sides of the compartment are formed by the upper and lower casings 12 and 14. The bottom of the compartment is formed by the mirror support and stand 34 which is pivotally mounted to the bottom surface of the lower casing and moves within an aperture of substantial size therein. The proximal end of the reflecting chamber is formed by the wall 43 and the stand 34 as described hereinafter.

The stand 34 includes a pair of substantially triangularly shaped side panels 72, a rectangularly shaped and pivotally mounted latch panel 74 and the pivoted and recessed bottom panel 76. The bottom panel 76 is provided with a recessed portion 78 within which a power line storage frame 80 is mounted. At the proximal end of the panel 76 there is provided a pivot pin 82 about which the entire stand pivots to permit the opening and closing of the stand 34 generally. A mirror support frame 84 made of bent sheet metal is mounted to the inner side of the bottom panel 76. The frame 84 is shaped so as to provide space into which the recess 78 can extend and to permit the mirror 60 to overhang the end thereof. The mirror is arranged to extend toward the cassette receiving compartment 20; the back side of the frame 84 and the overhang of the mirror 60 in conjunction with the compartment wall 43 form the priximal wall of the chamber 56.

When the stand 34 is in its open or extended position the inner or upper end of the latch panel 74 is pivoted about its pivotal mounting 86 into engagement with a latch member 88 by means of a coil-torsion spring 90. The upper or inner edges of each of the side walls 72 are bent outwardly to form an ear which engages a peripheral edge of the lower casing 14. These ears 92 prevent the entire stand 34 from pivoting completely out of the chamber 56. Thus in its open or extended position the mirror and stand are restrained in their movement by means of the ears 92 and the latch member 88. This thus permits the accurate location of the mirror 60 for reflecting the image to the screen 18.

Figure 9:
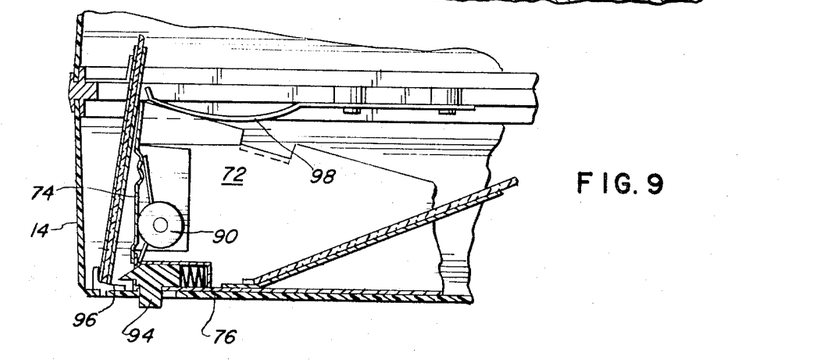
FIG. 9 is a fragmentary sectional view similar to FIG. 3 depicting the stand assembly in the closed or stored position.

In order to close the stand 34 the upper edge of the latch panel 74 is urged toward the proximal end of the viewer or as in FIG. 3 pivoted inwardly or in a clockwise direction about the pivot pin 86 so as to disengage from the latch 88 and thereby permit the stand to be moved upwardly into the compartment 56. Referring now to FIG. 9 it will be seen that in the closed position the bottom panel 76 is flush with the bottom of the lower casing 14. In order to lock the stand in the closed position a spring biased latch member 94 is mounted to and centrally positioned at the distal end of the bottom panel 76 and when the stand 34 is in the closed position the latch member 94 engages a cooperative locking member 96 so as to prevent the stand 34 from opening. When the stand is closed each of the side walls 72 is engaged by a downwardly biased leaf spring 98 which biases the stand 34 against the latch 94 and thus in a tight rattle-free condition. When it is desired to open the stand the latch member 94 is moved so as to disengage from the locking member 96. When this is done the biasing springs 98 urge the entire stand 34 outwardly thereby providing a pop-open feature. In order to complete the opening and locking of the stand 34, the bottom panel is moved to its fully extended position at which point the torsion spring 90 causes the upper edge of the front panel to engage the latch 88.

OPTICAL SYSTEM

Figure 4:
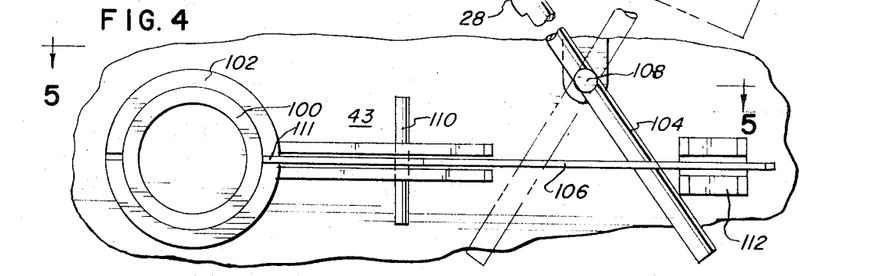
FIG. 4 is an enlarged fagmentary elevational view, taken substantially on the line 4—4 of FIG. 2, showing a portion of the optical system and means for focusing the same.
Figure 5:
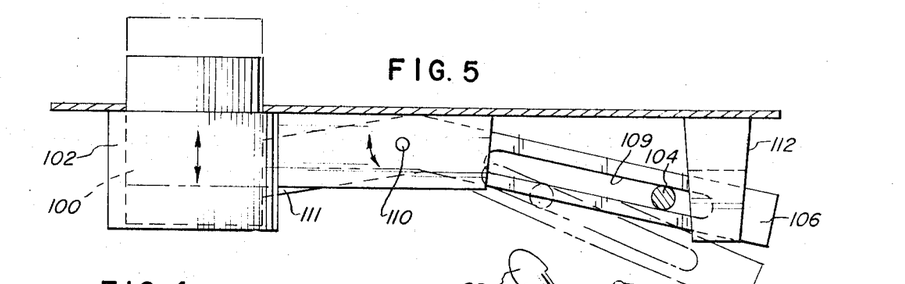
FIG. 5 is a fragmentary plan view taken substantially on line 5—5 of FIG. 4, and showing other features of the optical focusing system.

In order to focus the image on the screen 18 the objective lens system 54 as seen in FIG. 3 is movable along the optical axis in response to the lateral movement of the lever 28 as seen in FIGS. 1 and 2. The direction of this movement is shown in FIG. 5 by the arrow on the lens system 54. In order to achieve the movement along this axis the lens elements are mounted within a barrel 100 which is positioned for sliding engagement within a cylindrical housing 102 which is in turn mounted to the cassette compartment floor 41. Referring now to both FIGS. 4 and 5 it is seen that the focus control lever 28 is connected to the barrel 100 through a pivoted rod 104 which cammingly engages a pivotally mounted bar 106 at one end with the other end being mounted to the barrel 100. From FIG. 4 it is seen that the rod 104 is pivotally mounted to the distal side of the cassette compartment wall 43 by means of a pivot pin 108. The lower end of the rod 104 extends downwardly and through the slot 109 provided in the bar 106. As seen from FIGS. 4 and 5 the pin 108 permits only lateral movement of the rod 104. This lateral movement of the lever handle 28 causes the rod 104 to move laterally and thus urge the bar, or rod, 106 toward either the distal or proximal end of the casing. The bar 106 is pivotally mounted by means of a pivot pin 110 for movement in a plane parallel to the pivot axis of the rod 104. The other end 111 of the rod 106 is mounted to the barrel 100. Thus lateral movement of the handle 28 from left to right as shown in FIG. 4 causes the lower end of the rod 104 to move from right to left thereby urging the bar 106 to pivot in a clockwise direction about the pivot pin 110. This movement causes the barrel 100 to move rearwardly or toward the proximal end of the viewer 10 generally. In order to assure alignment of the rod 106 a slotted guide bracket 112 is mounted to the distal side of the compartment wall 43. The slotted end of the bar 106 moves within the slot provided in the bracket 112 and is not restrained in its movement within the slot.

The discussion thus far has described the structural aspects of the viewer and the optical system for focusing the image. Referring back to the cassette compartment 20, it will be seen from FIG. 2 that the bulb housing 46 provides lateral alignment for the cassette 38. The cassette is a U-shaped member having two coplanar but spaced storage compartments which are connected by a bight portion. The inner sides of the storage compartment surround the sides of the housing 46 to provide the lateral alignment. The housing 46 is also provided with a plurality of louvers 114 for convection cooling of the bulb 50. As seen in FIGS. 1 and 3 the cassette compartment cover 22 is provided with a plurality of louvers 116 which are sligned with the louvers 114 so as to permit complete convection cooling.

Figure 6:
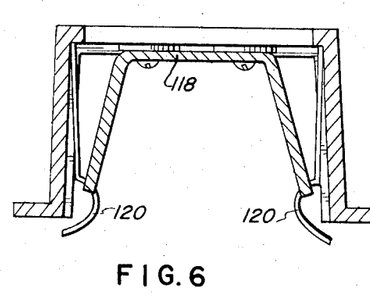
FIG. 6 is an enlarged cross-sectional view, taken substantially along line 6—6 shown in FIG. 2 and illustrating some details of the projection-bulb protector and the cassette-aligning cover.

The housing 46 as shown in FIGS. 3 and 6 includes a protective bulb cover 118 which also functions to prohibit light from exiting through the louvers 114 and 116. Such light might disturb the user of the viewer. In order to securely mount the cover 46 a pair of inwardly biased leaf springs 120 are mounted to the inner sides of the housing 46. These springs are adapted to engage the sides 121 of the columnating lens system 52. From FIGS. 2 and 8 it is seen that the springs 42 which are mounted to the distal wall 43 of the compartment 20 act to bias the cassette 38 in the proximal direction and against the guide posts 40. The action of the springs 42 and guide posts 40 provide the distal-proximal (front to back) alignment for the cassette 38.

Figure 8:
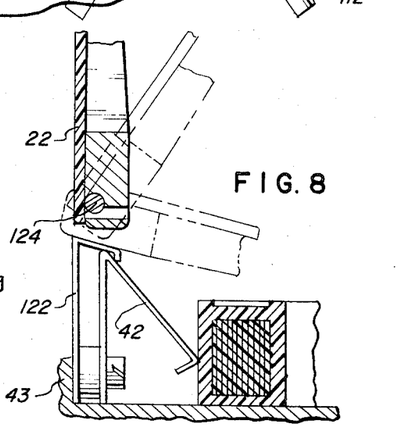
FIG. 8 is a fragmentary view taken substantially along the line 8—8 of FIG. 2 showing the cassette compartment cover in full lines a biased-open position, and in broken lines in the biased-closed position.

As seen in FIG. 8, the cassette compartment cover 22 is maintained in either the open or closed position by means of a biasing leaf pring 122 which is also mounted to the distal compartment wall. From FIG. 8 it is seen that the cover 22 is pivotally mounted about a laterally extending pivot pin 124. The pin is located in an over-center position with regard to the surfaces of the cover which engage the leaf spring 122 so that the leaf spring 122 provides a force capable of maintaining the cover in either the closed position or in the open position.

The surfaces of the cover which engage in the leaf spring are relatively flat so as to provide the maximum amount of surface contact and to further assure the retention of the cover in either the closed position or raised open position.

In order to eject a cassette, the cover 22 is opened and the eject lever 26 is moved toward the distal end of the viewer. The lever 26 is integral with a bent wire formation which is mounted for rotation in a position below the cassette compartment floor 41. The cassette compartment floor is provided with a pair of slots 126 which are parallel to one another and disposed on either side of the bulb housing 46. The lever mechanism 26 is spring biased, by means of a coil-tension spring 128, into a closed position and includes a pair of cassette engaging arms 130 which are adapted to move through the slots 126 and into the cassette compartment 20. A pair of journals 132 mounted to the underside of the compartment floor assure rotation of the arm 130 into the slots 126. When the lever 26 is moved, the arm 130 rotates through the slots 126 and into the compartment 20; as the arms enter the compartment 20 they engage the bottom proximal edge of the cassette and move it out of engagement with the guide posts 40 and into a position out of alignment with the optical axis and into position from which the cassette can be grasped and removed from the compartment.

The cassette 38 itself includes a pair of reels 134 and 136 which rotate about parallel but spaced axes. A pair of alignment rollers 138 and 139 are also provided so that film trained thereover will be disposed and located at a position intermediate the proximal and distal walls of the bight portion of the cassette 38. The film is secured to and trained about the reel 134, the roller 138, the roller 139 and secured to the other reel 136.

TRANSPORT MECHANISM

The transport mechanism permits the film to be transported in either direction at two different speeds so that any particular frame may be quickly located and may then be brought into exact alignment with the aperture 48. Thus one complete frame can be quickly located and projected onto the screen 18.

Figure 7A:
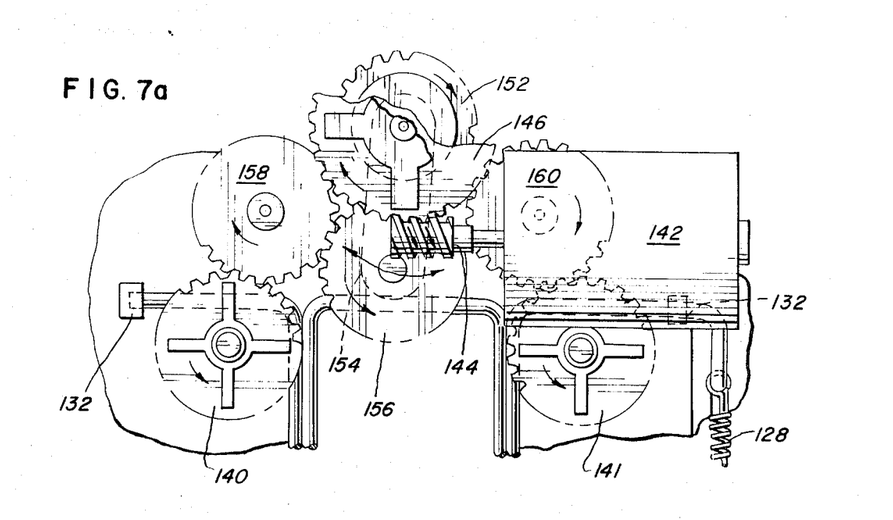
Figure 7B:
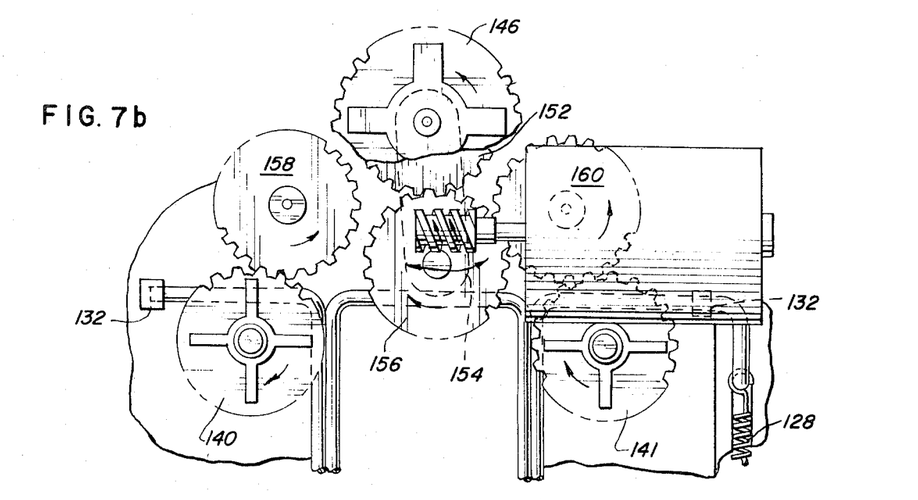

The transport mechanism includes a reversible electric motor and a gear system responsive to the change in the direction of rotation of the electric motor. Referring now to FIGS. 2, 7a and 7b, it will be appreciated that FIGS. 7a and 7b are bottom plan views of the gear system, that is they are taken from the bottom toward the cassette compartment floor. The drive bits 44 and 45 which engage the reels 134 and 136 are mounted to a pair of shafts (not shown) which are in turn mounted to the gears 141 and 140 respectively. In operation, as will be described hereinafter, only one gear 140 or 141 is driven by the gear system and the other gear is disengaged from the drive system and is free or pulled by the filmstrip as it is being transported. For example, as the gear 140 rotates as shown in FIG. 7a it rotates the bit 45 and the bit in turn causes the reel 136 to rotate in a clockwise direction. As the reel 136 rotates it moves the film in a left to right direction thereby causing a clockwise rotation of the bit 44, the reel 134 and the disengaged gear 141. By means described hereinafter, the system can be reversed so that the reel 134 is the driving reel and the reel 136 is the pulled reel.

Referring now to FIG. 7a the gear system is in a mode operative to rotate the reel 136 in a clockwise direction. In order to rotate the reel in that direction the control switches 30a and 30b are actuated which energize the motor 142. A worm gear 144 is mounted to the motor and rotates in the direction shown by the arrow. The worm gear 144 acts as a pinion and engages a larger spur type gear 146. Referring to FIG. 3 it is seen that the spur gear is mounted at the lower end of a shaft 148 which is journaled for rotation to a cassette compartment floor at 150. As seen in FIG. 7a, this rotation of the worm gear 144 causes a clockwise rotation of the spur gear 146. Also mounted to the shaft 148 at a position between the spur gear 146 and the journal 150 is another but smaller spur gear 152. Thus as the spur gear 146 rotates in a clockwise manner the smaller spur gear 152 will rotate in the same direction. A gear supporting arm 154 is also mounted to the shaft 148 but at a position intermediate the gear 152 and the journal 150. Rotatably mounted at the end of the arm 154 is yet another gear 156 as seen in FIG. 3 the gear 156 is mounted on a shaft and spring biasing arrangement 158. As can be seen the gears 152 and 156 mesh with each other for rotation. As the gear 152 rotates the in clockwise direction (see FIG. 7a) it rotates the gear 156 in a counterclockwise direction. The reaction forces acting on the teeth of gear 156, causes the entire gear 156 and arm 154 to rotate in a clockwise direction about the shaft 148. The gear 156 and arm 154 rotate in a clockwise direction until the gear 156 engages the rotatably mounted idler gear 158. As the gear 156 engages the gear 158 it is caused to rotate in a clockwise direction. The gear 140 to which the bit 45 is mounted is journaled to the compartment floor and arranged to engage the idler gear 158. Thus the clockwise rotation of the idler gear 158 imparts a counterclockwise rotation to the driving gear 140.

As the arm 154 and gear 156 moves in an arc about the shaft 148 and into engagement with the gear 158, the gear 152 disengages from the right-hand idler gear 160. Thus the gear 160 and the gear 141 are not driven or connected to the driving gear system and are therefore free to rotate as the film is being transported.

Referring now to FIG. 7b the direction of rotation of motor has been reversed which imparts a counterclockwise movement to the gear 146 and the gear 152. The arm 154 swings in a counterclockwise direction until the gear 156 disengages from the idler gear 158 and engages the right-hand idler gear 160. The engagement of the idler gear 160 by the gear 156 causes the gear 160 to rotate in a counterclockwise direction thereby imparting a clockwise rotation to the driving gear 141. Viewed from FIG. 2 the rotation of the gear 141 imparts a counterclockwise rotation to the reel 134, which in turn causes a right to left movement of the filmstrip.

Thus by means of the system described the filmstrip can be caused to be transported in either a left to right or right to left direction by merely electrically reversing the DC motor 142. It will be appreciated that it is very desirable to have a quiet operating gear system and a lubrication free system and to this end the spur gears used herein are made of a material which is strong and which does not require lubrication, such as nylon.

ELECTRICAL CIRCUITRY

In the illustrative embodiment, the motor 142 has four modes of operation, each of which modes is controlled by one of the four control switches 30a, 30b, 30c and 30d which are interlocked so that only one can be operated at a time. Each of these switches are characterized as double-pole double-throw push button switches. Each switch comprises four stationary contacts and two contact arms, the contact arms of each switch being ganged so as to move together when the respective switch is manually pushed. When the motor 142 is at rest, the winding of the motor is shorted and the contact arms are in the positions illustrated in FIG. 10. By shorting the winding in this manner during rotating of the rotor, an effective magnetic brake for the motor rotor is provided. Apparently when the field winding is shorted, the field breaks down and the motor effectively acts to generate a high voltage thereby providing a strong magnetic force tending to brake the rotor movement.

Figure 10:
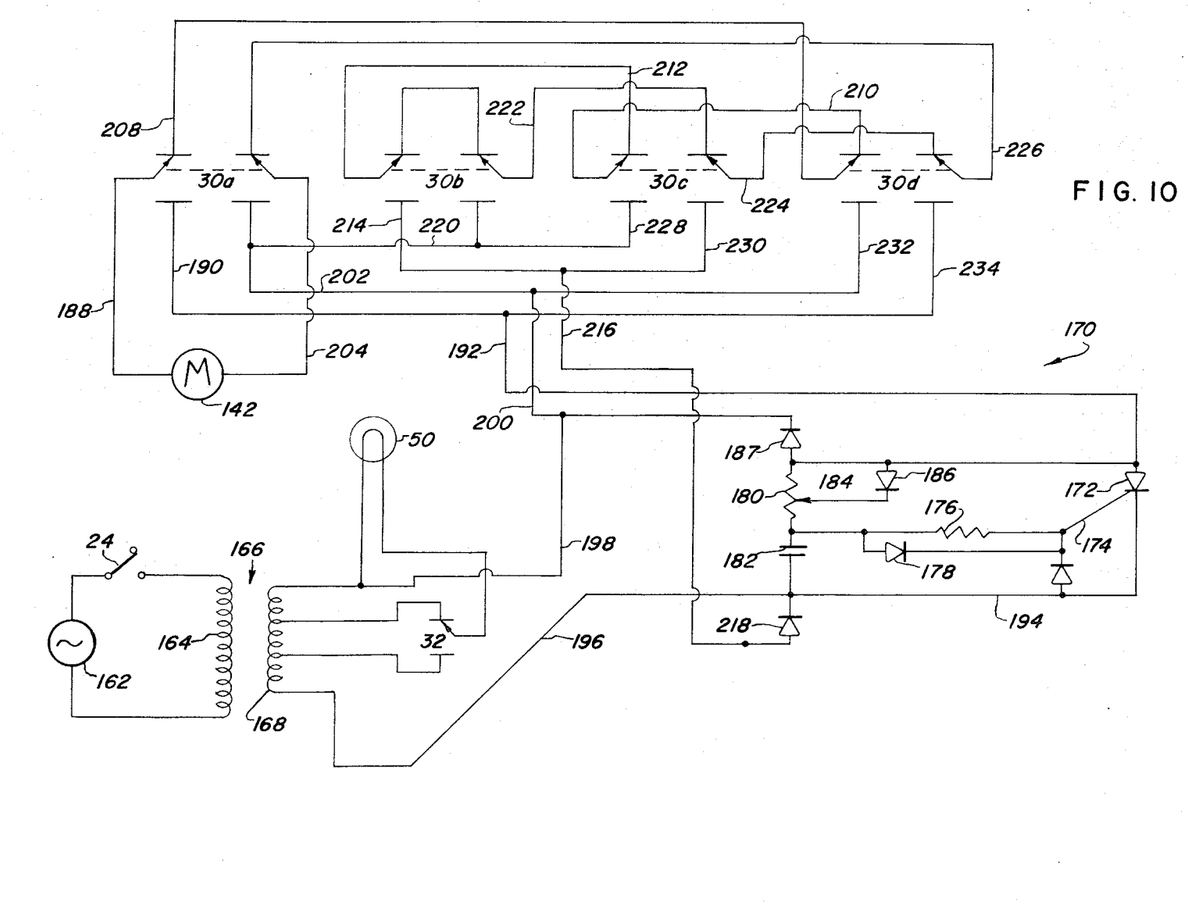
FIG. 10 is an electrical circuit diagram showing the illuminating and motor control circuitry.

As shown in FIG. 10, an alternating current source 162 feeds the primary 164 of transformer 166 through off-on switch 24. Connected across one portion of the secondary 168 of transformer 166 is the lamp 50 to provide illumination when the viewing apparatus has been turned on. Lamp 50 is connected to the secondary 168 through a switch 32 which, in its position as illustrated, connects lamp 50 across a smaller portion of the secondary than if the switch were thrown to its other position.

The four modes of operation enable the motor to be run at two different speeds and in opposite directions. In order for the motor to run at its fast speed, it is connected almost directly across secondary 168. When the slower speed is desired, a motor speed control circuit 170 generally is utilized.

The speed control circuit 170 could be any one of the many types well-known in the art. In the illustrative embodiment, the speed control circuit 170 comprises a silicon-controlled rectifier (SCR) 172, the gate 174 of which is connected through current limiting resistor 176 and diode 178 to gate regulation resistor 180 and capacitor 182. The gate resistor 180 is variable by means of arm 184 connected through diode 186 to the anode of SCR 172. The slow speed of the motor can be adjusted at the factory by moving arm 184 to vary the firing angle of SCR 172. The blocking diode 187 is connected in the circuit to prevent undesirable feedback.

In the operation of this circuit of FIG. 10, assuming the operator wishes the motor, and hence worm 144, to rotate at its slow speed in the clockwise direction, as viewed from the left in FIG. 7a, switch 30a is actuated. This rotation produces a left to right movement of the film. The circuit through the winding of motor 142 is completed via line 188, the contact arm of switch 30a, line 190, line 192, SCR 172, line 194, line 196, transformer secondary 168, line 198, line 200, line 202, the right contact arm of switch 30a, and line 204.

If, for example, the operator desires the motor to run fast in the clockwise direction, switch 30b is depressed by the operator. The current through the motor winding will then follow via line 188, line 208, line 210, line 212, line 214, line 216, rectifier 218, line 196, secondary 168, line 198, line 200, line 202, line 220, line 222, line 224, line 226, and line 204.

If, for example, the operator wants the motor to turn fast in the counterclockwise direction, switch 30c is depressed. The current through the motor winding will follow line 188, line 208, line 210, line 228, line 202, line 200, line 198, secondary 168, line 196, rectifier 218, line 216, line 230, line 224, line 226 and line 204.

If, for example, the operator wishes the motor to run slowly in the counterclockwise direction, switch 30d is depressed. The current through the motor winding will then follow line 188, line 208, line 232, line 200, line 198, secondary 168, line 196, line 194, SCR 172, line 192, line 234, line 226, and line 204.

In order to use the viewer the user loads the cassette 38 into the cassette receiving compartment 20 by engaging the biasing leaf springs 42 and then pressing the cassette onto the drive hubs 44 and 45 and engaging the guide posts 40. The power cord is then unwound from the storage frame 80 and plugged into a suitable power source. Next the stand 34 is opened to its extended position. It will be appreciated that no light can enter the reflecting compartment 56 through the stand since the stand forms light-tight seals with respect to the lower casing 14. The lamp 50 is turned on by switch 24 and the image of the frame appearing in the aperture 48 is cast on the screen 18. In viewing FIG. 3 it will be seen that little, if any, light from the lamp 50 can enter the reflecting chamber 56, except through the optical system. The compartment wall 43, the overhang of the mirror 60 and the back of the mirror support frame 84 act as an effective light trap. Thus substantially all the light entering the reflecting chamber 56 enters through the optical system; hence a high contrast image is assured. Depending upon ambient light conditions the dark screen 64 is left in place or removed. The image is focused by moving the control 28; other frames are located for viewing by appropriate use of the traversing and scanning buttons 30a, 30b, 30c and 30d. When the user wishes to remove the cassette he opens the cover 22 and ejects the cassette using lever 26. The viewer can then be turned off by switch 24, the power cord stored on the frame 80 and the stand 34 closed. The viewer 10 may then be stored or carried to its next place of use.

It will be appreciated that the numerous changes and modifications can be made to the embodiment disclosed herein without departing from the spirit and scope of this invention.

What I claim and desire to secure by Letters Patent of the United States is:

1. In a microfilm viewer, wherein a reel-to-reel film having a large plurality of microphotographs thereon is carried in a cassette that is arranged for cooperation with a viewing apparatus that includes a casing, a planar mounting deck for the cassette, illuminating means for illuminating the film, optical means for projecting the illuminated film, a viewing screen for viewing the projected illumination, and drive means separate from the cassette, but positioned and adapted to cooperate with the reels in the cassette for selectively moving the film in opposite directions; the improvement comprising, in combination: spaced elongated drive hubs journalled in and extending through said mounting deck and having ends shaped and arranged for releasable driving engagement with the reels of a cassette, an elongated driven shaft parallel to said hubs extending transversely to the side of the deck opposite the one upon which the cassette is positioned and being operatively associated with the drive means to rotate about the shaft axis in opposite directions as the drive means are driven in opposite directions, and transfer gear means between the shaft and the two hubs for effecting positive drive from the shaft to only one or the other of the two hubs depending upon the direction in which the shaft is rotated, said transfer gear means comprising four gears located in a plane transverse to the axes of the driven shaft and hubs, and adjacent and parallel to the mounting deck, a first of the four gears being mounted on the driven shaft to rotate therewith, second and third gears spaced from the first gear and each drivingly associated with only one of the two hubs, the fourth gear constantly meshing with the first gear and being held in spaced relation to the axis of the driven shaft, rotation of the first gear in either direction causing the fourth gear automatically to planet about the axis of the driven shaft into meshing and driving relation with one of the second and third gears, so that as the driven shaft rotates in opposite directions the fourth gear operates to drive either the second or third gears.

2. A microfilm viewer as in claim 1 wherein fifth and sixth gears are provided located in the same plane with said four gears, said fifth and sixth gears each being respectively carried by one of the two hubs to rotate therewith, and said fifth and sixth gears each drivingly meshing with one of said second and third gears.

3. A microfilm viewer as in claim 1 wherein the drive means includes a motor whose rotor is constructed and arranged to run at two different speeds and in opposite directions, and including four manual controls operatively associated with the viewer and the motor for selecting both speed and direction of rotation of the motor to provide flexibility to a user in moving film within the cassette selectively forwardly or backwardly and at either high speed or low speed to provide means for locating a frame of the film desired to be read.

* * * * *